United States Patent [19]
Back et al.

[11] Patent Number: 6,136,373
[45] Date of Patent: *Oct. 24, 2000

[54] METHOD FOR COATING REACTIVE METAL ALLOY POWDERS AND THEIR USE IN DECOMPOSING AND IMMOBILIZING ORGANIC COMPOUNDS

[75] Inventors: Dwight D. Back; Charlie Ramos, both of Melbourne; John A. Meyer, Palm Bay, all of Fla.

[73] Assignee: Mainstream Engineering Corporation, Rockledge, Fla.

[*] Notice: This patent is subject to a terminal disclaimer.

[21] Appl. No.: 09/190,224

[22] Filed: Nov. 13, 1998

[51] Int. Cl.[7] .................................................. B05D 7/00
[52] U.S. Cl. ..................... 427/214; 427/212; 427/215; 427/216; 427/220; 588/200
[58] Field of Search ..................... 427/212, 214, 427/215, 216, 220; 588/200; 210/506

[56] References Cited

U.S. PATENT DOCUMENTS

| | | | |
|---|---|---|---|
| 5,472,661 | 12/1995 | Gay . | |
| 5,482,702 | 1/1996 | Murphy et al. . | |
| 5,834,114 | 11/1998 | Economy et al. | 427/228 |
| 5,922,926 | 7/1999 | Back et al. | 588/200 |
| 5,990,373 | 11/1999 | Klabunde | 588/200 |

OTHER PUBLICATIONS

Bruk et al., "A Method for Encapsulation of Powders by Vapor–Phase Polymerization," *Colloid Journal*, vol. 57, No. 2 (1995), pp. 160–165, (No Month).
One et al., Chemical Abstract, 1990:8195.
Matsumura et al., Adhesive 4–META/MMA–TBB Opaque Resin with Poly (methyl methacrylate) –coated Titanium Dioxide, *J. Dent. Res.*, 67 (1) :29–32, Jan. 1988.
Yamaguchi et al., Coating of metal powder surface with polymethyl methacrylate, *17 Chem. Ind.*, 748 (1975) (No Month).

*Primary Examiner*—Shrive Beck
*Assistant Examiner*—Paul D. Strain
*Attorney, Agent, or Firm*—Evenson, McKeown, Edwards & Lenahan, P.L.L.C.

[57] ABSTRACT

Metal powders or granules, comprised of at least 2 alloyed metals selected from the group consisting of alkaline metals, alkali metals, transition metals, metalloids, and rare earth metals are coated with an organic monomer, oligomer, polymer, or other organic compound. The metal powders or granules are in hydride, oxide, or reduced form. The coated metal powders or granules are used to decompose and/or immobilize organic compounds containing at least one hetero atom.

24 Claims, No Drawings

METHOD FOR COATING REACTIVE METAL ALLOY POWDERS AND THEIR USE IN DECOMPOSING AND IMMOBILIZING ORGANIC COMPOUNDS

CROSS-REFERENCE TO RELATED APPLICATION

Ser. No. 08/863,335 now U.S. Pat. No. 5,972,926, which is directed to related subject matter is incorporated in its entirety herein by reference.

The U.S. Government may have certain license rights to the invention described and claimed herein pursuant to contract DAMD17-97-C-7017 awarded by the Department of the Army.

BACKGROUND AND SUMMARY OF THE INVENTION

Ser. No. 08/863,335 now U.S. Pat. No. 5,972,926, discloses the preparation of metal alloy powders or granules and their use in decomposing or immobilizing organic compounds containing at least one hetero atom. The present invention is directed to the additional step of coating the metal alloy particles with an organic barrier layer. More specifically, a predetermined combination of processes selected from the group consisting of evacuation, heating, hydrogen exposure and oxygen exposure can be used to activate and prepare a metal alloy powder prior to exposing the powder to a monomer, oligomer, polymer or other organic compound. The monomer, oligomer, polymer or other organic compound directly reacts with or undergoes a reaction catalyzed by the prepared metal alloy in such a way so as to produce a layer of organic material that either physically or chemically adheres to or combines with the metal alloy particle surface.

The metal alloys comprise at least two metals selected from the group consisting of transition metals, alkaline metals, and rare earth metals. The present invention also provides the means by which the metal alloys can be prepared and used to decompose or immobilize harmful chemicals without having the side effect of being harmful or otherwise reactive by contact.

We have also discovered that additional metal alloys selected from the groups of alkali metals (e.g., Na and Li) and metalloids (e.g., Si, B, and Al), can equally be utilized in the present invention to yield powders coated with organic monomers, oligomers, polymers, or other organic compounds.

The present invention therefore relates to the preparation of metal powders or granules and coating thereof with an organic compound, and the subsequent use of the coated metal powders or granules to decompose and immobilize organic wastes containing at least one hetero-atom, for example, halogenated solvents and chemical warfare agents.

Prior art in the coating or encapsulation of metals and other powders include the coating of $NaHCO_3$ particles disclosed in U.S. Pat. No. 5,482,702 for use in antiperspirants. U.S. Pat. No. 5,472,661 discloses the process whereby a larger metal powder is spray coated with a finer powder containing a polymer binder. Metal oxides and carbonates have also been encapsulated by radiation-induced vapor phase polymerization at 25–65° C. with vinyl monomers as disclosed in Bruk and Kirpikov, *A Method for Encapsulation of Powders by Vapor-Phase Polymerization*, 57 Colloid Journal No. 2 (1995). Ono and Takahashi, Chemical Abstract 1990:8195, discloses the spontaneous polymerization of methyl methacrylate in the presence of Cu, Al or Ni powders. Matsumura and Nakabayashi, *Adhesive 4-META/MMA-TBB Opaque Resin with Poly(methyl methacrylate)-coated Titanium Dioxide*, J. Dent. Res. 67(1) :29–32 (1988) discloses the coating of $TiO_2$ particles by aqueous phase polymerization of methyl methacrylate. Yamaguchi et al., *Coating of metal powder surface with polymethyl methacrylate*, 17 Chem. Ind. 748 (1975) discloses the polymerization of methyl methacrylate onto Al, Fe, Cu, or Ag surfaces in aqueous $SO_2$.

A comprehensive discourse of prior art related to metal and metal alloy catalysts is given in incorporated Ser. No. 08/863,335 which details the usefulness of activating metal alloy materials so as to increase their reactivity and to decrepitate the materials to finer scale powders, leaving the materials in a reactive state that is in the form of an oxide, hydride, or reduced metal. A reduced metal state hereby refers to an instance whereby the final process step is evacuation or evacuation with heating so that the metal alloy is considered neither oxide nor hydride and the metal exists in an elemental state.

An object of the present invention is to produce coated metal alloy powders or granules by contacting the metal alloy powders or granules, activated in a manner described by U.S. Pat. No. 5,922,926, with a monomer, oligomer, polymer, or other organic compound in a liquid or vapor state. The organic compound can also exist as a solid at room temperature and, when mixed and then heated with the metal alloy material, it undergoes a phase change to a liquid and/or vapor form and reacts with the metal alloy material.

Another object of the present invention is to carry out the metal alloy particle coating process without an aqueous phase or other solvent. Thus, the process involves the use and direct contact of a monomer, oligomer, polymer, or other organic compound with the metal alloy particle in an activated state.

Another object of the present invention is to use the coated metal alloy particles for decomposing or immobilizing chemicals containing at least one hetero-atom.

The present invention also provides a reactive metal alloy substrate that is not reactive to physical contact due to the presence of the coating material, which serves as a barrier between the physical contact and the reactive metal alloy material.

DETAILED DESCRIPTION OF THE INVENTION

According to a presently preferred embodiment of the present invention, a metal alloy powder or granule comprised of at least 2 metals selected from the group consisting of transition metals, alkaline metals, alkali metals, metalloids, and rare earth metals, is (1) prepared according to the methods of U.S. Pat. No. 5,922,926, and (2) reacted with an appropriate monomer, oligomer, polymer, or other organic compound, in liquid or vapor form, that adheres to or combines with the surface of the metal alloy particles producing a barrier or coating. The barrier or coating organic compound can either be chemically or physically bound to the surface of the metal alloy particle. The metal powder-or granule exposed to the organic precursor material can exist in an oxide, hydride, or reduced state prior to exposure to the monomer, oligomer, polymer, or other organic compound such as glycols or ethers.

Metal alloy powders or granules such as alanates (e.g., $LiAlH_4$ or $NaAlH_4$) and boronates (e.g., $NaBH_4$) may also be subjected to the preparation process of now U.S. Pat. No.

5,922,926 to reduce and oxidize contaminants present on the surface of the particle to render the materials more reactive or to further decrepitate the materials. These materials may also be treated only by evacuation or evacuation with heating to activate the materials prior to introducing the alloys to the organic monomers, oligomers, polymers, or other organic compounds.

The present invention teaches the production of coated, reactive metal alloys by reacting a metal hydride, metal oxide, or reduced metal with a monomer, oligomer, polymer, or other organic compound to produce an organic coating or adhesion on the surface of the metal particle, which differs in properties from the starting organic compounds.

One mechanism for this process is the polymerization or chain-lengthening of the monomer, oligomer, or polymer molecule as a result of reaction with or catalysis of the hydrogen or oxygen present at the surface of the metal alloy. We have confirmed the presence of organic species on the surface of the particles that were produced according to the methods of this invention. These organic species have much higher melting points than the starting organic compounds, indicative of larger molecular weight compounds. The hydrogen or oxygen present at the surface of the prepared metal alloy hydride or oxide can also react with the organic compound to produce derivatives of the organic compound. Similarly, organo-metallic compounds could be produced at or near the surface of the metal alloy particles as a result of carrying out the present invention.

The presence of dissociated hydrogen (H+) at the surface of the metal alloy, whereby the metal powder is retained in a hydride state before exposure to the organic precursor material, can be an effective free-radical initiator for olefins such as ethylene, tetrafluoroethylene, propylene or perfluoropropylene. Methyl methacrylate also polymerizes by the mechanisms of free-radical propagation. As another example, the metals Li and Na have been proven to be effective anionic polymerization catalysts, so other metals such as Mg, Ca, Ni, Ti, Fe, and Mn would be expected to also promote surface reactions. Cationic polymerization is catalyzed by acids, so it is expected that the presence of dissociated hydrogen at the metal surface would be an effective catalyst. Metal ox-ides have also been demonstrated to be excellent catalysts. Thus, a metal alloy powder retained in a reactive oxidative state after using the activation processes of Ser. No. 08/863,335 could initiate polymerization or other molecular transformation processes at the surface of the particle, thereby creating products that can physically or chemically adhere to the surface.

EXAMPLE 1

A powder of $TiFe_{0.9}Mn_{0.1}$ hydride was prepared by cycling the material between hydrided and unhydrided states 3 times, with a final step of hydriding the material to leave it in an activated, hydrided state. The material was then contacted with liquid methacrylate. Heat was generated by the combination of these compounds as measured by thermocouple. After cooling to room temperature, the container was opened and the powder was removed.

A portion of the powder was subject to differential scanning calorimetry (DSC) analysis to measure thermal endotherms. This test showed an endotherm around 130–150° C. at a temperature greater then the boiling point of methyl methacrylate (103° C.) but less than the 274° C. melting point of highly polymerized poly(methyl methacrylate), which has a weight-average molecular weight of about 996,000. The material is therefore not methyl methacrylate or highly polymerized methyl methacrylate, but instead an organic compound derived from methyl methacrylate having a molecular weight less than 996,000. The texture of this particular power was sticky, indicating the presence of an adhesive material on the surface of the particles.

EXAMPLE 2

A powder of $Mg_2Ni$ hydride was prepared by hydride/dehydride cycling and then exposed to perfluoropropylene ($C_3F_6$). When exposing the powder to the gas, there was a noticeable drop in pressure in the perfluoropropylene container indicating a reaction was consuming the monomer. After the reaction was complete, a sample of the powder was removed and tested via DSC.

An endotherm was found at a temperature of around 330–340° C., which is similar to the melting point of poly(tetrafluoroethylene) at 327° C. Since perfluoropropylene would polymerize to poly(hexafluoropropylene), which is similar to poly(tetrafluoroethylene), the compound responsible for the endotherm is presumably a larger molecular weight compound derived from the perfluoropropylene.

EXAMPLE 3

A powder of $CaNi_5$ hydride was prepared by 2 hydride/dehydride cycles and then reacted with perfluoropropylene vapor without any exposure to air. Endotherms at around 74–83° C. were measured via DSC and are the result of a reaction between the metal alloy and the perfluoropropylene, since the perfluoropropylene has a melting point and boiling point of −156° C. and −29° C., respectively.

This experiment was repeated by alternating hydride cycles and exposing to oxygen (i.e., air) to increase decrepitation, followed by a final hydride step and exposure to perfluoropropylene. The final material in these experiments was a free-flowing, fine, dry powder.

EXAMPLE 4

A sample of $Mg_2Ni$ hydride power was prepared by hydride cycling. The powder was then exposed to propylene glycol butyl ether. A broad endotherm at around 286° C. was observed via DSC. Since the boiling point of propylene glycol butyl ether is about 171° C., this higher temperature endotherm is due to compounds other than the reactants.

EXAMPLE 5

A sample of $Mg_2Ni$ power was activated by hydride/dehydride cycles ending with exposure to air so as to produce a metal oxide surface. The powder was then exposed to perfluoropropylene. Endotherms were measured via DSC at about 250–260° C. and also at about 350–370° C. These endotherms are a result of reaction between the metal alloy and perfluoropropylene, since they cannot be explained from the pure reactant components.

EXAMPLE 6

A powder sample of $Mg_2Ni$ oxide was prepared by 2 hydride/oxide cycles and exposure to air. The powder was then exposed to polyethylene glycol methyl ether. A broad endotherm was measured at around 300° C., and the powder had a wet, sticky texture.

EXAMPLE 7

A powder sample of $LaNi_5$ hydride was prepared using one hydrogen and one air exposure cycle, ending with hydrogen exposure. The powder was then exposed to perfluoropropylene. DSC endotherms were measured in the temperature range of about 275–325° C.

EXAMPLE 8

A sample of LiAlH$_4$ was placed in a container and evacuated to less than 50 millitorr low-moderate (about 50° C.). The material was then separately exposed to perfluoropropylene (vapor) and polyethylene glycol butyl ether (liquid). Higher temperature DSC endotherms were measured on the final powder products than could be attributed to the liquid or vapor reactants.

EXAMPLE 9

A sample of powder produced by the reaction of TiFe$_{0.9}$Mn$_{0.1}$ hydride and methyl methacrylate was exposed to both thiodiethanol and dimethyl methyl phosphonate (DMMP), which are chemical warfare agent simulants. About 22% of the thiodiethanol and 97% of the DMMP were immobilized or decomposed as measured by HPLC.

EXAMPLE 10

A sample of powder produced by the reaction of Mg$_2$Ni hydride and propylene glycol butyl ether was exposed to dimethyl methyl phosphonate. About 45% of the DMMP was immobilized or decomposed as measured by HPLC. In separate tests, the propylene glycol butyl ether alone did not react with the DMMP so the immobilization or decomposition of DMMP with the coated particles is a result of the reactivity of the underlying, coated metal alloy and/or products produces by the reaction between the metal alloy and propylene glycol butyl ether.

EXAMPLE 11

A sample of powder produced by the reaction of CaNi$_5$ hydride and perfluoropropylene was exposed to thiodiethanol and dimethyl methyl phosphonate. About 2% of the thiodiethanol and 60% of the DMMP were immobilized or decomposed as measured by HPLC.

EXAMPLE 12

An activated powder alloy of TiFe$_{0.9}$Mn$_{0.1}$ was prepared by four cycles of hydriding, evacuating, air exposure, milling, and evacuating, followed by a final exposure to air. The powder was then exposed to methyl methacrylate liquid. Following this treatment, the powder was exposed to CHCl$_3$ at 300° C. for 1 hour. By mass balance, it was determined that 94% of the chloroform had been decomposed.

EXAMPLE 13

A CaNi$_5$ powder was prepared with 5 oxygen/hydrogen cycles. During the process of exposing the sample to hydrogen or oxygen, the vessel containing the alloy was placed in an ultrasonics bath filled with water. The powder was then exposed to perfluoropropylene, and then placed in a vessel where it was exposed to chloroform. The conversion of chloroform after 4 hours was measured to be greater than 99% by dissolving the final powder in water and testing for chloride.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for coating a metal alloy powder or granule, comprising:

contacting a hydride, oxide, or reduced form of a metal alloy powder or granule comprised of at least two alloyed metals selected from the group consisting of transition metals, alkaline metals, alkali metals, metalloids, and rare earth metals, with an organic material, thereby forming a barrier coating on the metal alloy powder or granule, wherein the barrier coating is not reactive to physical contact.

2. The method of claim 1, wherein the organic material is an organic monomer, oligomer, or polymer.

3. The method of claim 1, wherein the organic material is a glycol or ether derivative.

4. The method of claim 1, wherein the organic material is at least one of ethylene, tetrafluoroethylene, propylene, perfluoropropylene, methyl methacrylate, propylene glycol butyl ether, and polyethylene glycol methyl ether.

5. The method of claim 1, wherein the coating is an oligomer or polymer.

6. The method of claim 1, wherein the coating is an organo-metallic compound.

7. The method of claim 1, wherein the coating is an organic compound having a higher melting point or a larger weight-average molecular weight than organic material.

8. The method of claim 1, wherein the metal alloy comprises transition metals selected from the group consisting of Cu, Ni, V, Cr, Mn, Fe, Ti, and Zr.

9. The method of claim 1, wherein the metal alloy comprises alkaline metals selected from the group consisting of Mg and Ca.

10. The method of claim 1, wherein the metal alloy comprises alkali metals selected from the group consisting of Li and Na.

11. The method of claim 1, wherein the metal alloy comprises metalloids selected from the group consisting of Al, B, and Si.

12. The method of claim 1, wherein the metal alloy comprises rare earth metals selected from the group consisting of Ce, La, Nd, and Pr.

13. The method of claim 1, wherein the metal alloy powder is prepared by at least one of hydride cycling, mechanical milling, alternating hydride and oxygen exposure cycles, and ultrasonic agitation.

14. A method for decomposing or immobilizing an organic compound having at least one hetero-atom, comprising:

contacting a hydride, oxide, or reduced form of a metal alloy powder or granule comprised of at least two alloyed metals selected from the group consisting of transition metals, alkaline metals, alkali metals, metalloids, and rare earth metals, with an organic material, thereby forming a barrier coating on the metal alloy powder or granule, wherein the barrier coating is not reactive to physical contact; and contacting the organic compound having at least one hetero-atom with the coated alloy metal powder or granule.

15. The method of claim 14, wherein the at least one hetero-atom is P, O, or S.

16. The method of claim 14, wherein the at least one hetero-atom is a halogen selected from the group consisting of F, Cl, Br, and I.

17. The method of claim 14, wherein the compound having at least one hetero-atom is thiodiethanol, dimethyl methyl phosphonate, or chloroform.

18. The method of claim 1, wherein the coating is a derivation of said organic material.

19. The method of claim 14, wherein the organic compound having at least one hetero-atom is a chemical warfare agent.

20. A method according to claim 1, wherein said barrier coating encapsulates the metal alloy powder or granule.

21. A method for coating a metal alloy powder or granule, comprising:

contacting a hydride, oxide, or reduced form of a metal alloy powder or granule comprised of at least two alloyed metals selected from the group consisting of transition metals, alkaline metals, alkali metals, metalloids, and rare earth metals with an organic monomer, oligomer, or polymer, thereby forming a barrier coating on the metal alloy powder or granule, wherein the barrier coating is not reactive to physical contact.

22. A method according to claim 21, wherein said forming comprises reacting said organic monomer, oligomer, or polymer with the metal alloy powder.

23. A method according to claim 21, wherein the metal alloy powder catalyzes polymerization of said organic monomer, oligomer, or polymer, thereby forming said coating.

24. A method according to claim 21, wherein said metal alloy powder is a hydride having disassociated hydrogen and said forming comprises free radical propagation of said organic monomer, oligomer, or polymer.

* * * * *